Figure 1:

United States Patent [19]

Jakubowicz

[11] Patent Number: 5,648,938
[45] Date of Patent: Jul. 15, 1997

[54] SEISMIC DATA ACQUISITION

[75] Inventor: Helmut Jakubowicz, Surrey, England

[73] Assignee: Ensign Geophysics Limited, Surrey, England

[21] Appl. No.: 318,335

[22] Filed: Oct. 5, 1994

[30] Foreign Application Priority Data

Oct. 6, 1993 [GB] United Kingdom ............. 9320540

[51] Int. Cl.$^6$ ................... G01V 1/20; G01V 1/28
[52] U.S. Cl. .................. 367/56; 367/21; 367/58; 364/421
[58] Field of Search ............... 367/21, 56, 58, 367/63; 364/421

[56] References Cited

U.S. PATENT DOCUMENTS

| 1,240,328 | 9/1917 | Fessenden . | |
| 2,732,906 | 1/1956 | Mayne . | |
| 4,742,497 | 5/1988 | Beasley et al. | 367/52 |

FOREIGN PATENT DOCUMENTS 2282665  4/1995  United Kingdom .

OTHER PUBLICATIONS

Kinneging et al, 61st Annu. GEG Int. ortg., Nov. 10, 1991, V–2, pp. 1373–1376, Pape. No. Sp 3–1; abst. only herewith.
McMechan et al, Gegrbysies, vol. 56, #3, pp. 390–396, Mar. 1991; abst. only herewith.

*Primary Examiner*—Nelson Moskowitz
*Attorney, Agent, or Firm*—Gary M. Nath; Nath & Associates

[57] ABSTRACT

A system for acquiring and processing seismic data comprises source-means for generating sound waves and receiver-means for recording as data those waves as reflected from sub-surface interfaces, and means for processing the recorded data operable to generate sets of actual data each individually associated with specific sub-surface reflection points, order the data-sets in accordance with receiver and source-means separation, process each data-set to generate additional data intermediate the recorded data, and re-order each data-set and additional data in accordance with receiver and source-means separation for further processing. Each data-set is applied to a filter to generate said additional data intermediate of the recorded actual data. The filter is selected from the group comprising linear, quadratic or spline interpolation filters, frequency space (f-x) filters, tau-p filters, smart filters artificially intelligent filters, neural network filters and (preferably) sinc filters. The recorded actual data are also subject to traveltime correction (for example NMO). Data collection may be by use of a single shot source and a plurality of receivers which are equi-spaced, linked in a linear array, and movable above a surface to be surveyed. The data-sets may comprise common receiver or common shot gathers and the described techniques are applicable to other forms of seismic data gathers.

28 Claims, 1 Drawing Sheet

```
          1 2 3 4 5 6 7 8 S        SHOT 1
           1 2 3 4 5 6 7 8 S       SHOT 1+
            1 2 3 4 5 6 7 8 S      SHOT 1++
             1 2 3 4 5 6 7 8 S     SHOT 1+++
              1 2 3 4 5 6 7 8 S    SHOT 2
               1 2 3 4 5 6 7 8 S   SHOT 2+
                1 2 3 4 5 6 7 8 S  SHOT 2++
                 1 2 3 4 5 6 7 8 S SHOT 2+++
                  1 2 3 4 5 6 7 8 S SHOT 3
             d   1 2 3 4 5 6 7 8 S SHOT 3+
                  1 2 3 4 5 6 7 8 S SHOT 3++
                   1 2 3 4 5 6 7 8 S SHOT 3+++
             t     1 2 3 4 5 6 7 8 S SHOT 4
                    1 2 3 4 5 6 7 8 S SHOT 4+
                     1 2 3 4 5 6 7 8 S SHOT 4++
```

SEISMIC DATA ACQUISITION

The present invention relates to the analysis of seismic data, more particularly to data acquisition and processing systems and methods operable to supplement and/or optimise the analysis of seismic data.

Seismic surveying is a technique in which sound generated by a seismic (shot) source is received (and recorded) by a receiver or number of receivers after it has been reflected, refracted or otherwise affected by geophysical structures within the body of the earth—subsurface interfaces (see U.S. Pat. No. 1,240,328 Reginald H. Fessenden).

These recordings are usually made at a number of locations and, when combined with other similar recordings from different source and receiver locations, provide a multiplicity of data-sets on the subsurface structure.

The usual way of combining these data-sets is based upon the observation that recordings from points at a position halfway between the source and receiver (the midpoint) contain common information.

This technique, the common midpoint method, is described in detail in U.S. Pat. No. 2,732,906 (Harry W. Mayne).

The most significant parameter within the common midpoint method is the so called "fold" or "multiplicity" of data records, which is equal to the number of data recordings relating to the same (midpoint) position—or lying within a given area surrounding a notional midpoint position.

A principle of the common midpoint method is that, with the exception of external noise, data recordings relating to a given midpoint position differ one from the other in a manner depending only upon the separation of the source and the receiver.

Common information in the recorded signals, for example the earliest or primary reflections from a particular point on a geological interface, may be enhanced by compensating for the distortions introduced by the source and receiver separation (the so-called offset distortions) and combining the recorded data for each point—"stacking".

Such a combination is inappropriate for recorded sound that does not conform to the primary reflections (e.g. multiple reflections, refractions or ground roll) hence these sound waves, which would degrade the seismic analysis, are suppressed in the stacking technique.

In general this form of processing is most effective when there is a high fold of data—a very large number of recordings for each point on the geological interface.

In addition to the benefits of stacking, the common midpoint method also enables access to other combinations of data records which may be useful in additional noise suppression or analysis. For example, data records showing a common source location recorded at many different receiver locations may include source-generated noise (e.g. ground roll) which may then be removed through a procedure know as "multichannel filtering" or "velocity filtering".

Similarly, data records from different source locations may be combined according to common receiver locations—thereby enabling additional opportunities for noise suppression. Another combination often used is where all data records share a common source-receiver separation. Each of these data records "gathers" (that is to say common midpoints, common source, common receiver and common offset) has particular advantages for particular multichannel procedures and may be used in the course of analyzing information gathered in a seismic survey. The nature of several such procedures is described in Gijs J O Vermeer's book "Seismic Wavefield Sampling" published by the Society of Exploration Geophysicists in 1990.

Both the fold (multiplicity of recorded data-sets for any particular point) and the general properties of the multichannel "gathers" are determined by the actual source and receiver locations used in the survey. These locations may be (and typically are) chosen to provide regular distribution of survey points along a single line or a grid of interconnected, widely separated lines "2-D seismic data", or be selected to cover a wide area with approximately equal separations in all directions (3-D data).

Midpoint separation is normally chosen with regard to the known geophysical variations in the subsurface and ideally is small enough to detect and show the most rapid changes (fault reflections and diffractions) within the frequency range which can be obtained by the data.

This distance—the midpoint interval or midpoint spacing—is another important parameter in a seismic survey and is usually equal to half the distance between adjacent receivers.

The fold and sampling of the various "gathers" of the data-sets are then determined by the maximum number of recordings that may be made from a single source location together with the distance between each source location.

A practitioner skilled in seismic data acquisition will normally set these parameters having regard to the limits of the recording equipment together with other, cost and equipment, constraints.

It should be noted that the source separation is an important consideration. When surveying on land closer separations require additional cost, time and effort whilst at sea the continuous motion of the source (normally carried by a boat) with the time taken to make the recordings place a lower limit on the source separation which can be achieved without additional traverses and additional cost.

As a general principle the distribution of the source and receiver locations should satisfy the symmetric sampling criterion (the distance between each source locations is the same as the distance between each receiver location at which recordings are made) proposed by Vermeer in 1990 (op. cit.). In practice such a distribution limits the potential noise suppression of the common midpoint method and may also limit analysis or processing in other multichannel "gathers" (Vermeer op. cit. page 50, paragraph 4).

For "end-on" geometries (where the source is always located to one side of the receiving/recording locations) this problem may be overcome by recording with a source interval equal to half the group interval. (Vermeer op. cit. page 50 paragraph 5). This option is expensive both in terms of time and equipment. Alternatively, the symmetric sampling method may be used to "reconstruct" intermediate recordings from those actually made (Vermeer op. cit. page 50 paragraph 5 and Section 5.6) this enables standard processing to be carried out without any of the limitations which otherwise would be imposed by imperfections in the raw data obtained.

Such a procedure is not standard practice and to our knowledge has never yet been used nor, even in the noted passages of Vermeer, is there a practical description of the implementation of the method. Some of the assumptions made by Vermeer in his proposals are frequently not met in practice.

The particular difficulty that we believe arises with Vermeer's proposal, as published, is that many surveys utilise the technique called "flip-flop" or "multi-source" acquisition of recorded data. This method sacrifices the source separation along a single underwater traverse to increase the number of traverses which may be made (thereby reducing the cost, time and effort required to make the recordings). This is attained by alternating two or more sources with different perpendicular offsets from the line of the recorders/receivers in the underwater traverse. Such acquisition techniques typically have the direct effect of reducing the "fold" for each underwater traverse by a factor equal to the number of perpendicular source offsets used compared to that which might be obtained with a single underwater traverse technique. Additionally stacking and other multichannel procedures may further be compromised.

It is an object of the present invention to propose a system for data acquisition, and a method of processing data acquired, which alleviates and/or overcomes the difficulties found with the known data acquisition methods available at present.

In one aspect the present invention provides a system for acquiring and processing seismic data, comprising in combination source-means for generating a plurality of sound waves, receiver-means for receiving and recording as data sound waves generated by the source-means and reflected from sub-surface interfaces, and means for processing the recorded data which are operable to generate sets of actual data each individually associated with the respective ones of a plurality of specific subsurface reflection points, order the actual data-sets generated in accordance with the receiver- and source-means separation, process each actual data-set to generate additional data intermediate the recorded actual data, and re-order each actual data-set with the additional data in accordance with receiver and source-means separation.

The means for processing the recorded data may be effective to apply each actual data-set to a filter (as herein defined), operable to generate said additional data intermediate of the recorded actual data.

Said filter is preferably selected from the group comprising linear, quadratic or spline interpolation filters, frequency space (f-x) filters, tau-p filters, smart filters, artificially intelligent filters, neural network filters and sinc filters (i.e. those comprising the mathematical fraction (sin (x))/x applied through the mathematical procedure known as "convolution" or "filtering" where 'x' is the spatial co-ordinate).

Desirably, the filter comprises a sinc filter (as hereinbefore defined).

The means for processing the recorded data may provide that the actual recorded data are processed in an optimal manner for this technique to remove therefrom differences between high and low velocity received sound waves in accordance with source-, and receiver-means separation.

There may be provided a single source and a plurality of receiver-means equi-spaced one from the other, each receiver-means being operable to receive sound waves emitted by the source as reflected from a sub-surface interface.

Advantageously, the source-means and receiver-means are linked and normally (but not essentially) formed in a substantially linear array, and are movable above a surface to be surveyed.

The sets of data may comprise common receiver gathers (as herein defined) abstracted from a plurality of operations of the source-means at a number of different locations, such that the source and receiver positions satisfy the requirements of common midpoints.

Alternatively, the sets of recorded data may be common shot gathers (as herein defined) taken from a number of different spaced receiving locations.

Again, the system may provide that the recorded actual data-sets comprise common shot (or common receiver) gathers which are ordered in accordance with receiver-, and source-means separation and applied to a first horizontal filter to generate additional data intermediate the actual recorded data, the actual recorded data then being re-ordered with the additional data to form sets of common receiver (or common shot) gathers which are applied to a further horizontal filter which generates further additional data intermediate of the common receiver (or common shot) data, the sets of common receiver or common shot data then being re-ordered with the additional common receiver or common shot data for further processing.

In a second aspect the invention provides a method of processing data in the form of sound waves recorded by receiver-means, which sound waves have been generated by source means and reflected from sub-surface interfaces, which method comprises the steps of generating sets of actual data each individually associated with respective ones of a plurality of specific sub-surface reflection points, order the actual data-sets so generated in accordance with the receiver-, and source-means separation, processing each actual data-set to generate additional data intermediate of the recorded actual data, re-ordering each actual data-set with the additional data in accordance with receiver-, and source-means separation and further processing the data.

Desirably, each actual data-set is processed with a filter (as herein defined) to generate said additional data intermediate of the recorded actual data.

The filter may be selected from the group comprising frequency space (f-x) filters, tau-p filters, smart filters, artificially intelligent filters, neural network filters and sinc filters, and is preferably a sinc filter (as herein defined).

Advantageously, the method provides that the actual recorded data is processed to remove therefrom differences between high and low velocity received sound waves in accordance with source-, and receiver-means separation. Whilst in the case of symmetric sampling the technique proposed would simply be a manifestation of Vermeer's approach, the method otherwise offers the advantageous aspect of travel-time correction.

The sets of data may comprise common receiver gathers (as herein defined) abstracted from a plurality of operations of the source-means at a number of different locations.

Alternatively, the sets of recorded data may comprise common shot gathers (as here defined) taken from a number of different spaced receiving locations.

The method may provide that the recorded actual data-sets comprise common shot (or common receiver) gathers which are ordered in accordance with receiver and source-means separation and applied to a first horizontal filter to generate additional data intermediate of the actual recorded data, the actual recorded data then being re-ordered with the additional data to form sets of common receiver (or common shot) gathers which are applied to a further horizontal filter which generates further additional data intermediate of the common receiver (or common shot) data, the sets of common receiver or common shot data then being re-ordered with the additional common receiver or common shot data for further processing.

Figure 2:
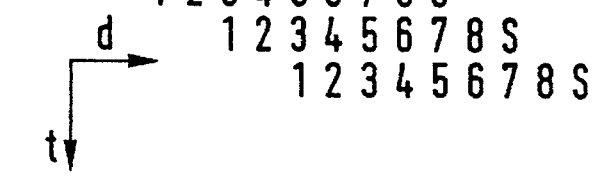
Figure 3:
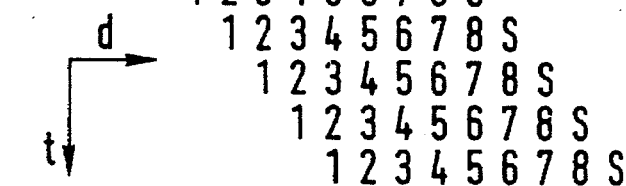
Figure 4:
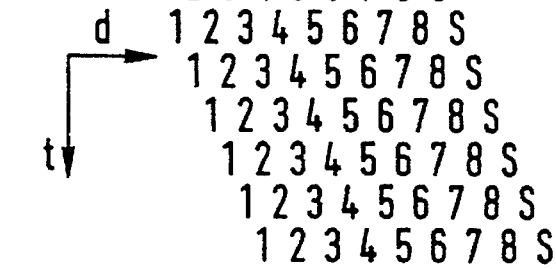

The above and other aspects, features and advantages of the present invention will become clearer from the description of embodiments of the invention now made with reference to the accompanying drawings, in which:

FIG. 1 illustrates a shot source and a linear array of receivers (geophones) used to gather data in one form of seismic data acquisition technique, FIG. 2 illustrates how the apparatus of FIG. 1 operates, FIG. 3 illustrates schematically partially processed data in accordance with a first embodiment of the invention, and FIG. 4 illustrates schematically partially processed data in accordance with a second embodiment of the invention.

FIG. 1 shows the apparatus used to gather seismic data to comprise a linear array of receivers (geophones) R linked by a cable 10 for towing under water behind a vessel (not shown). At one end of the cable there is provided a shot source S.

In this proposal the original acquisition geometry, it will be appreciated, performs in an "end-on" configuration in which the source is to one side of the receivers R which lie next to one another in line.

The cable 10 with source S and receivers R is towed behind a vessel and the source S is activated at preset time intervals (shot point intervals) equivalent to a predetermined distance of travel of the vessel. Shots can be taken at any time provided they are in the correct position but as vessels travel at a fairly constant speed shot location can be equivalent to time. For example, the distance travelled might be 50 m. It will be seen that the location of the source and each receiver is moved forwards by 50 m by each recording. In the example shown the spacing between the receivers R (and source S) is 25 m and the total number of recordings (traces) made at different consecutive receiver and source locations for a single shot is eight (there are eight receivers shown).

In the practical system there would normally be 120 or more receivers and there may be several parallel lines of receivers—each treated as separate individual line.

FIG. 2 illustrates the geometry in the form of a stacking diagram showing, in particular, the position of the source (s) and each of the receivers (numbered 1 to 8) in both distance (d) and shot location (t) as the traverse is made.

Coverage obtained with the geometry and using the common midpoint method of analysis is 2-fold (200%).

It is to be noted that this situation does not conform to the symmetric sampling criterion proposed by Vermeer (op. cit.) and therefore falls outside the scope of the technique proposed by him.

This particular example is of importance as it mimics the situation typically obtained with a combination of a single stream of receivers and one of two sources in a flip-flop or multi-source 3-D arrangement.

In accordance with the first embodiment of the invention the fold or coverage is doubled (from 2-fold to 4-fold) by interpolating an additional shot record halfway between the actual, acquired, shot records.

The system used, and the method of operating that system is as follows:

In Step 1 of the procedure data received by the receivers and then recorded is collated in the form of common receiver gathers—collections of data which share the same surface receiver location.

With the example shown in FIG. 2 one common receiver gather would be formed by collating the data obtained by receiver 7 on Shot 1, receiver 5 on Shot 2, receiver 3 on Shot 3 and receiver 1 on Shot 4 (it will be seen immediately that these receiver locations fall on the same vertical line in the diagram shown in FIG. 2).

A second particular common receiver gather will be the data from receiver 8 on Shot 1, receiver 6 on Shot 2, receiver 4 on Shot 3 and receiver 2 on Shot 4.

In the particular arrangement shown the maximum number of recordings in any common receiver gather is four although it will be appreciated with significantly more receivers the number of traces in each gather will be greatly increased.

It is to be noted further that each end of the line will have gathers which contain less than the number of traces in the generality of the gathers which will require special processing to minimise adverse effects in the technique (see below).

In Step 2 of the procedure the data in each common receiver gather is ordered in accordance with the shot sequence.

Thus the ordering within each common receiver gather reflects the source surface position. Thus the order receiver 7 on Shot 1, receiver 5 on Shot 2, receiver 3 on Shot 3 and receiver 1 on Shot 4 is correct whilst an ordering such as receiver 1 on Shot 4, receiver 5 on Shot 2 receiver 3 on Shot 3 and receiver 7 on Shot 1 would be incorrect.

It will be appreciated by the skilled reader that Steps 1 and 2, could be interchanged and may also (and we believe will usually be) combined into a single step. The actual ordering of the recorded data may mean that Step 2 is a consequence of Step 1.

As a practical effect the requirements of Steps 1 and 2 will depend upon the original ordering of the recorded data, however, previous processing or analysis of that data may have varied its ordering.

It will further be appreciated that other orderings of the data (e.g. the use of common midpoint gathers is well known in the art) could be used in the technique.

Step 3 of the procedure provides that the ordered data in each common receiver gather may have a traveltime correction applied to each trace.

Several traveltime corrections may be used one of which, currently widely used in this industry, is known as normal moveout correction (NMO). NMO is a standard processing technique within the seismic data acquisition industry which attempts to remove timing discrepancies arising from the variations of traveltime caused by different source-receiver separations (offset).

The correction makes use of the known source-receiver separation together with a user specified (generally time variable) velocity factor together with a hyperbolic assumption for the traveltime behaviour.

A NMO is designed, and is effective, to reduce the effects of generally low velocity (noise) signals which may be received by the receivers without harming higher velocity (primary) signals reflected from points on a subsurface interface.

Details of various traveltime corrections which may be applied will be well known to the skilled reader.

It should be noted that as Step 3 effectively applies to all traces in any gather a traveltime correction it may be applied to the traces in the gather prior to Step 1 or Step 2 if desired.

In principle Step 3 could be omitted (***) from the procedure—although this will, it is thought, lead to serious impairment of the results obtainable by the procedure.

After the data in each gather has been processed through the above three steps Step 4 of the procedure applies to the gather a horizontal filter to generate (interpolate) intermediate shot traces.

The actual filter used so far is the, well known in signal processing applications, sinc function. This filter is time invariant and depends solely on the spacing between the input traces.

In essence it takes all the samples at a given time in any particular gather and, using the ordering of the gather, interpolates a value of a recording at the same time at an intermediate location between two shots.

The effect of this filter is that the results of many shots contribute to a single output value.

This is repeated for all required times and source positions.

The values of the originally acquired data-sets may also optionally—and perhaps preferably—be altered by this procedure.

In principle the sinc function filter neither creates nor destroys data, however, we have found it to be vulnerable to input under-sampling. In particular if traveltimes change rapidly between traces this filter may generate false results. As a result we believe the traveltime corrections introduced in Step 3 of the procedure—which minimise traveltime differences between traces—enable the sinc function filter to more accurately reconstruct information in the data.

As noted the sinc function filter is time independent—its effectiveness is dependent upon the acquisition geometry and in particular the source spacing within the data-set comprising the common receiver gather.

This is thought to be advantageous as it results in the filter being impervious to noise in the data.

The skilled reader will be able to devise a number of different schemes increasing the efficiency, effectiveness and originality of the filter application in this step. Considerations would include the ordering of the calculations together with the accuracy and compactness of the filter.

Other interpolation filters, for example: linear, quadratic or spline interpolation filters could be used. This filter may also be combined with other operations related to other procedures.

Other filters may be desirable in certain circumstances. For example, where the shot spacing is greater than can be addressed with this approach more powerful, data dependent filters could then be used—such as so-called frequency (f-x) filters, tau-p filters, smart filters, artificially intelligent filters, and neural network filters which are commonly used in known interpolation techniques and could be used within the context of the procedures now discussed. Such filters may change with recording time and combine data from different shots and times.

It is our view, however, that such filters would be expensive and would risk introducing artificial information into the data.

After filtering (whichever form of filter has been used) Step 5 of the procedure provides that the traveltime corrections applied in Step 3 are reversed.

After the interpolation effected in Step 4 both the originally acquired and interpolated data incorporate the traveltime corrections applied in Step 3. The reversal of this traveltime correction restores the original traveltimes included in the original data acquisition.

In principle Step 5 is optional as in most cases the traveltime will be further altered as the signals are further processed and subsequent corrections could be combined with Step 5 to circumvent the need for duplicate calculations.

Removal of the traveltime corrections may also be postponed or delayed until a further stage in the procedure—for example, until after the next step.

Step 6 in the procedure provides that the data-set is sorted back to an order required for subsequent processing. In most cases this means the data-set is resorted into shot order in which traces having the same source position are collected together and then re-ordered in terms of (usually increasing) source and receiver separation. Other gather types, however, may be utilised.

If shot ordering is selected the actual and interpolated data used for further processing would appear to have been acquired with a geometry different to that actually used. Taking the example shown in FIG. 2 of the drawings the modified data generated by the procedure for use in the further processing is as shown in FIG. 3.

It will be seen from the above that the filtering provided to each common receiver gather in Step 4 has reduced the apparent spacing between shots in the gather from 50 m to 25 m. The maximum number of traces in each gather is now eight and subsequent common midpoint method analysis will simulate an acquisition geometry in which the coverage is 4-fold (400%).

In the arrangement shown in FIG. 3 the stacking diagram equivalent to that shown in FIG. 2 is shown with the interpolated traces (indicated by a +) introduced to positions where no actual data was previously provided.

The second embodiment of the invention which will now be described provides that the fold in the data-set is increased to eight so that using the acquisition geometry shown in FIG. 2 it is possible to achieve a stacking diagram such as illustrated in FIG. 4.

It will be apparent from the FIG. 4 that the required shot spacing has been reduced to 12.5 m and that common receiver gathers are required halfway between those actually obtained when the data was recorded.

The procedure followed is as follows:

Step 1, provides that common shot gathers are obtained or formed.

It is likely the data will be available in the form of common shot gathers as this is the natural order in which the data is required. If this is the case the step may be omitted.

Step 2, provides that the data is ordered in receiver sequence—that is to say with respect to source and receiver separation.

In Step 3 a traveltime correction is applied to each trace in each common shot gather (the effect of this traveltime correction is essentially the same as discussed with regard to Step 3 of embodiment 1 and need not be further discussed here).

Step 4 provides that each trace of the common shot gather generated (and traveltime corrected) has applied to it a horizontal filter which interpolates intermediate common shot records.

This is equivalent to the processing described in Step 4 of embodiment 1 and the same comments apply.

The number of apparent receivers has now been increased from 8 to 16 and the effective receiver spacing reduced to 12.5 m.

Step 5 provides that all the common shot gathers—including the interpolated traces—are sorted into common receiver gathers and Step 6 of the procedure provides that the common receiver gathers are ordered in accordance with shot sequence.

In Step 7 of the procedure a horizontal filter is applied to each trace of each common receiver gather enabling the generation of intermediate, interpolated, shot traces.

The filter used in this Step may be the same, or of a similar nature, or be different to that used in Step 4.

At this point in the procedure the shot spacing has effectively been reduced to 12.5 m and each common receiver gather now contains 16 traces—approximately twice as many as are necessary to achieve the desired 8-fold enhancement of the acquired data.

Step 8 of the procedure provides that additional traces not required to achieve the desired acquired data enhancement are discarded leaving only the traces shown in FIG. 4 in the desired stacking diagram and in which the effective receiver spacing is 25 m.

Step 9 of the process provides that the traveltime corrections applied in Step 3 are reversed (this is equivalent to the operation in Step 5 of embodiment 1 and need not be further discussed), and Step 10 provides that the data is sorted back to an order required for subsequent processing (this is equivalent to the operation in Step 6 of embodiment 1 and need not be further discussed).

It is to be noted that the sequences of operations in the above procedures are not to be taken as unique. In the second procedure for example two horizontal filters are used independently of each other and they may be interchanged without effecting the end results. Thus the data could be first collated as common receiver gathers with shots being interpolated and—after this interpolation—being re-sorted to common shot gathers for receiver interpolation.

Such a procedure only requires receiver interpolation on every other shot, but whilst being efficient is significantly more complex and complicated that the particular procedure disclosed.

It will be appreciated that the described arrangements increase the fold of the acquired seismic data without additional acquisition effort (and may be used to reduce and minimise the acquisition requirements).

The described techniques include practical implementation of Vermeer's reconstruction proposals and refinements thereto enhancing the processing and enabling the production of data with source intervals greater than the receiver separation to be optimally reconstructed.

A very useful application of the technique now proposed is that it may be used to generate data having shot intervals less than those actually used. This enables a higher fold to be obtained than in the original acquisition and improves the operation of the midpoint stacking operation whilst enabling general multichannel processing to be optimally preformed.

The processing arrangement described have already proved successful in processing low-fold multi-source data to obtain results comparable to those obtained with higher-fold (more expensive) data acquisition equipment.

The essence of the proposals now made lie in the application of sequential one-dimensional filters each of which corresponds to a band-limited sampling (sinc function) filter of which the highest frequency is the Nyquist frequency for the separation of neighbouring recordings. This filter is applied at each time sample in each data gather as described and acts over all recordings in the gather—which is ordered in accordance with increasing (or decreasing) source—receiver separation.

Each application of the filter generates additional data between the data already in the gather (e.g. for which actual recordings have been obtained). The actual data and the amount of additional data is selectable according to a user's requirements. The filter may be applied either directly in space or in the spatial frequency domain.

In the typical application described with reference to Embodiment 1 the filter is applied to common receiver gathers and generates additional data effectively at shot locations intermediate of those actually obtained. Depending upon the geometry of the acquisition and as desired this single application may be sufficient to generate data at the desired source interval.

For symmetric sampling and when data is required at source locations midway between corresponding receiver locations an additional interpolation is necessary using common shot data as discussed with reference to Embodiment 2.

In this case—as the skilled reader will see—the amount of data generated need not be further increased and only some of the generated additional data is required—the rest may be discarded or omitted from the calculation.

We believe that the normal moveout (traveltime) correction used in the described embodiments is a significant refinement having regard to suggestions made by earlier workers in the field—notably Vermeer (op. cit.). This correction when appropriately chosen optimises the amount of data which may be reconstructed by at least a further factor of two in spatial frequency. Details of the normal movement correction will depend upon the seismic velocities in the area being surveyed but may be construed or inferred without detailed knowledge of the geophysical data in the seismic data-set.

In particular the correction may be optimally chosen as a hyperbolic function corresponding to the well known normal movement correction with artificial velocity values which over-correct the low velocity (noise) energy whilst under-correcting the high-velocity (primary) energy.

As a result of this a higher range of spatial frequencies may be reconstructed in the interpolation than would otherwise be possible.

After interpolation the correction is reversed thereby rendering the data compatible with what would have been obtained by actual recording.

It is believed the skilled reader will see other variations and modifications which may be made to the described arrangements which do not depart from the scope of the invention.

In particular the skilled reader will appreciate that the operations now described may be applied to gathers other than those described (e.g. common midpoint gathers or common offset gathers) to further increase or optimise the sampling fold in the data.

I claim:

1. A system for acquiring and processing seismic data, comprising: source-means for generating a plurality of discrete sound excitations, receiver-means for receiving and recording as data sound waves generated by reflection of said sound excitations from subsurface interfaces, and means for processing the recorded data to remove therefrom differences between high and low velocity sound waves in accordance with source and receiver-means separation to generate sets of actual said data each said set containing data relating to a respective one of a plurality of specific subsurface reflection points, to order the actual data sets generated in accordance with the receiver and source-means separation, to process each actual data set to generate additional data intermediate the recorded actual data of that actual data set, and to re-order each actual data set with the generated additional data for the same actual data set in accordance with receiver and source-means separation.

2. A system as claimed in claim 1, wherein the means for processing the recorded data applies each actual data set to a filter operable to generate said additional data intermediate of the recorded actual data.

3. A system as claimed in claim 2, wherein said filter is selected from the group comprising linear, quadratic or spline interpolation filters, frequency space (f-x) filters, neutral network filters and sinc filters.

4. A system as claimed in claim 3, wherein the filter comprises a horizontal sinc filter.

5. A system as claimed claim 1, wherein there is provided a single source-means and a plurality of receiver-means equi-spaced one from the other, each receiver-means being operable to receive sound waves emitted by the source-means as reflected from a sub-surface interface.

6. A system as claimed claim 5, wherein there is provided a single source-means and a plurality of receiver-means equi-spaced one from the other, each receiver-means being operable to receive sound waves emitted by the source-means as reflected from a sub-surface interface.

7. A system as claimed in claim 1, wherein the source-means and receiver-means are linked and formed in a substantially linear array, and are movable above a surface to be surveyed such that the source and receiver positions satisfy the requirements of common mid points.

8. A system as claimed in claim 6, wherein the source-means and receiver-means are linked and formed in a substantially linear array, and are movable above a surface to be surveyed such that the source and receiver positions satisfy the requirements of common mid points.

9. A system as claimed in claim 1, wherein the sets of data comprise common receiver gathers abstracted from a plurality of operations of source-means at a number of different locations.

10. A system as claimed in claim 8, wherein the sets of data comprise common receiver gathers abstracted from a plurality of operations of source-means at a number of different locations.

11. A system as claimed in claim 1, wherein the sets of recorded data comprise common shot gathers taken from a number of differently spaced receiving locations.

12. A system as claimed in claim 8, wherein the sets of recorded data comprise common shot gathers taken from a number of differently spaced receiving locations.

13. A system as claimed in claim 7, wherein the recorded actual data sets comprise common shot gathers which are ordered in accordance with receiver and source-means separation and applied to a first filter to generate additional data intermediate of the actual recorded data, the actual recorded data then being re-ordered with the additional data to form sets of common receiver gathers which are applied to a further horizontal filter which generates further additional data intermediate of the common receiver data, the sets of common receiver data then being re-ordered with the additional common receiver data for further processing.

14. A method of processing data in the form of sound waves recorded by receiver means, which sound waves are reflections from subsurface interfaces of discrete sound excitations generated by source means, which method comprises the steps of: removing therefrom differences between high and low velocity sound waves in accordance with source and receiver-means separation, generating sets of actual said data each said set containing data relating to a respective one of a plurality of specific subsurface reflection points, ordering the actual data sets so generated in accordance with the receiver and source-means separation, processing each actual data set to generate additional data intermediate of the recorded actual data of that actual data set, re-ordering each actual data set with the generated additional data for the same actual data set in accordance with receiver and source-means separation and further processing the data.

15. A method as claimed in claim 14, wherein each actual data set is processed in a filter operable to generate said additional data intermediate of the recorded actual data.

16. A method as claimed in claim 15, wherein the filter is selected from the group comprising linear, quadratic or spline interpolation filters, frequency space (f-x) filters, tau-p filters, smart filters, artificially intelligent filters, neural network filters and sinc filters.

17. A method as claimed in claim 16, wherein the filter is a sinc filter.

18. A method as claimed in claim 14 wherein the actual recorded data is optionally processed to remove therefrom differences between high and low velocity received sound waves in accordance with source and receiver-means separation, which processing may optionally be reversed.

19. A method as claimed in claim 18, wherein the sets of data comprise common receiver gathers abstracted from plurality of operations of the source-means at a number of different locations.

20. A method as claimed in claim 18, wherein the sets of recorded data comprise common shot gathers taken from a number of different spaced receiving locations.

21. A method as claimed in claim 20, wherein the recorded actual data sets comprise common shot gathers which are ordered in accordance with receiver and source means separation and applied to a first horizontal filter to generate additional data intermediate of the actual recorded data, the actual recorded data then being re-ordered with the additional data to form sets of common receiver gathers which are applied to a further horizontal filter which generates further additional data intermediate the common receiver data then being re-ordered with the additional common receiver data for further processing.

22. A system as claimed in claim 7, wherein the recorded actual data sets comprise receiver gathers which are ordered in accordance with receiver and source-means separation and applied to a first filter to generate additional data intermediate of the actual recorded data, the actual recorded data then being re-ordered with the additional data to form sets of common shot gathers which are applied to a further horizontal filter which generates further additional data intermediate of the common shot data, the sets of common shot data then being re-ordered with the additional common shot data for further processing.

23. A method as claimed in claim 18, wherein the recorded actual data sets comprise receiver gathers which are ordered in accordance with receiver and source-means separation and applied to a first filter to generate additional data intermediate of the actual recorded data, the actual recorded data then being re-ordered with the additional data to form sets of common shot gathers which are applied to a further horizontal filter which generates further additional data intermediate of the common shot data, the sets of common shot data then being re-ordered with the additional common shot data for further processing.

24. A method as claimed in claim 23, wherein the recorded actual data sets comprise receiver gathers which are ordered in accordance with receiver and source-means separation and applied to a first filter to generate additional data intermediate of the actual recorded data, the actual recorded data then being re-ordered with the additional data to form sets of common shot gathers which are applied to a further horizontal filter which generates further additional data intermediate of the common shot data, the sets of common shot data then being re-ordered with the additional common shot data for further processing.

25. A system for acquiring and processing seismic data, comprising:

source-means for generating a plurality of sound waves, receiver-means for receiving and recording as data sound waves generated by the source-means and reflected from subsurface interfaces, and means for processing the recorded data which are operable to generate sets of actual data each set containing data relating to a respective one of a plurality of specific subsurface reflection points, to order the actual data sets generated in accordance with the receiver and source-means separation, to process each actual data set to generate additional data intermediate the recorded actual data, and to re-order each actual data set with the additional data in accordance with receiver and source-means separation, and wherein the means for processing the recorded data is operable to provide that the actual recorded data is processed to remove therefrom differences between high and low velocity received sound waves in accordance with source and receiver-means separation.

26. A system for acquiring and processing seismic data, comprising:

source-means for generating a plurality of sound waves;

receiver-means for receiving and recording as data sound waves generated by the source-means and reflected from subsurface interfaces; and means for processing the recorded data which are operable to generate sets of actual data each said set containing data relating to a respective one of a plurality of specific subsurface reflection points, to order the actual data sets generated in accordance with the receiver and source-means separation, to process each actual data set to generate additional data intermediate the recorded actual data, and to re-order each actual data set with the additional data in accordance with receiver and source-means separation, wherein the means for processing the recorded data applies each actual data set to a filter operable to generate said additional data intermediate of the recorded actual data, wherein said filter is selected from the group comprising linear, quadratic or spline interpolation filters, frequency space (f-x) filters, neural network filters and sinc filters, and wherein the means for processing the recorded data is operable to provide that the actual recorded data is processed to remove therefrom differences between high and low velocity received sound waves in accordance with source and receiver-means separation.

27. A method of processing data in the form of sound waves recorded by receiver means, which sound waves have bene generated by source means and reflected from subsurface interfaces, which method comprises the steps of:

generating sets of actual data each said set containing data relating to a respective one of a plurality of specific subsurface reflection points;

ordering the actual data sets so generated in accordance with the receiver and source-means separation;

processing each actual data set to generate additional data intermediate of the recorded actual data;

re-ordering each actual data set with the additional data in accordance with receiver and source-means separation; and further processing the data, wherein each actual data set is processed in a filter operable to generate said additional data intermediate of the recorded actual data, wherein the filter is selected from the group comprising linear, quadratic or spline interpolation filters, frequency space (f-x) filters, tau-p filters, smart filters, artificially intelligent filters, neural network filters and sinc filters and wherein the actual recorded data is optionally processed to remove therefrom differences between high and low velocity received sound waves in accordance with source and receiver-means separation, which processing may optionally be reversed.

28. A method of processing data in the form of sound waves recorded by receiver means, which sound waves have been generated by source means and reflected from subsurface interfaces, which method comprises the steps of:

generating sets of actual data each said set containing data relating to a respective one of a plurality of specific subsurface reflection points;

ordering the actual data sets so generated in accordance with the receiver and source-means separation;

processing each actual data set to generate additional data intermediate of the recorded actual data;

re-ordering each actual data set with the additional data in accordance with receiver and source-means separation; and further processing the data, wherein the actual recorded data is optionally processed to remove therefrom differences between high and low velocity received sound waves in accordance with source and receiver-means separation, which processing may optionally be reversed, and wherein the recorded actual data sets comprise common shot gathers which are ordered in accordance with receiver and source means separation and applied to a first horizontal filter to generate additional data intermediate of the actual recorded data, the actual recorded data then being re-ordered with the additional data to form sets of common receiver gathers which are applied to a further horizontal filter which generates further additional data intermediate the common receiver data then being re-ordered with the additional common receiver data for further processing.

* * * * *